United States Patent [19]
Yanagisawa

[11] Patent Number: 4,812,027
[45] Date of Patent: Mar. 14, 1989

[54] GAUSS TYPE NEAR FOCUS LENS

[75] Inventor: Masaaki Yanagisawa, Tokyo, Japan

[73] Assignee: Nikon Corporation, Tokyo, Japan

[21] Appl. No.: 206,292

[22] Filed: Jun. 14, 1988

[30] Foreign Application Priority Data

Jun. 19, 1987 [JP]  Japan ................................ 62-152653
Sep. 18, 1987 [JP]  Japan ................................ 62-234389

[51] Int. Cl.$^4$ ............................ G02B 9/64; G02B 9/62
[52] U.S. Cl. ....................................... 350/463; 350/464
[58] Field of Search ................................. 350/463, 464

[56] References Cited

U.S. PATENT DOCUMENTS

| | | | |
|---|---|---|---|
| 4,392,724 | 7/1983 | Hamanishi | 350/463 |
| 4,466,711 | 8/1984 | Yokota | 350/464 |
| 4,553,823 | 11/1985 | Kato et al. | 350/463 |

FOREIGN PATENT DOCUMENTS

56-114918  9/1981  Japan .
59-143116  8/1984  Japan .

*Primary Examiner*—John K. Corbin
*Assistant Examiner*—Scott J. Sugarman
*Attorney, Agent, or Firm*—Shapiro and Shapiro

[57] ABSTRACT

A Gauss type rear focus lens includes a forward group having, in succession from the object side, a first lens component having its convex surface facing the object side and having a positive refractive power, a second lens component comprised of at least one lens and having a positive refractive power, and a third lens component having its sharply concave surface facing the image side and having a negative refractive power, the forward group having a positive refractive power as a whole, and a rearward group disposed on the image side relative to the forward group, the rearward group having a fourth lens having its sharply concave surface facing the object side and having a negative refractive power, a fifth lens having its sharply convex surface facing the image side and having a positive refractive power, and a sixth lens having a positive refractive power, the rearward group having a positive refractive power. During the focusing from infinity to a short distance, the rearward group is moved along the optic axis.

8 Claims, 1 Drawing Sheet

GAUSS TYPE NEAR FOCUS LENS

BACKGROUND OF THE INVENTION

1. Field of the Invention

This invention relates to a Gauss type rear focus lens in which a rearward group is moved toward the object side along the optic axis to thereby accomplish focusing.

2. Related Background Art

Gauss type lenses have heretofore been utilized widely from the standard to the long focus, but if an attempt is made to obtain a lens of long focus and great relative aperture, it becomes considerably large in size and heavy in weight. Moreover, in the total axial movement of the conventional focusing type, the heavy entire lens system must be moved and therefore, it has been difficult to accomplish quick focusing.

To solve such problems, Gauss type lenses of two-group construction which comprise a forward group and a rearward group each having a positive refractive power and in which the rearward group is moved toward the object side along the optic axis to thereby accomplish focusing are proposed by Japanese Laid-Open Patent Application No. 56-114918, U.S. Pat. No. 4,466,711 and Japanese Laid-Open Patent Application No. 59-143116.

However, these Gauss type lenses are generally suited for the quasi-wide angle to the standard lenses, and the attempt to utilize them as long focus lenses encounters the following problems.

In Japanese laid-Open Patent Application No. 56-114918, the amount of movement of the rearward group which is the focusing group is great during focusing and unless the air space between the forward group and the rearward group is secured sufficiently, it becomes impossible to accomplish sufficient short distance focusing. In U.S. Pat. No. 4,466,711, the lens diameter of the rearward group which is the focusing group is large and therefore, the focusing group becomes heavy, and this is not preferable. In Japanese Laid-Open Patent Application No. 59-143116, the amount of movement of the rearward group which is the focusing group is great and it becomes impossible to accomplish sufficient short distance focusing. Also, the lens diameter of the focusing group is large and therefore, the focusing group becomes heavy and moreover, a great spacing must be secured between the forward group and the rearward group, and this leads to the inconvenience that the compactness of the lens is spoiled.

Particularly recently, with the advance of the auto focus, it has been strongly desired to achieve a light weight of the focusing group in order that the load applied to a drive motor for focusing by the amount of movement and weight of the focusing group may be small and quick focusing may be accomplished.

SUMMARY OF THE INVENTION

It is therefore the object of the present invention not only to achieve a light weight of the focusing group and the focusing from infinity to a close distance about ten times the focal length, but also to provide a compact Gauss type rear focus lens which can obtain a good image which maintaining relatively wide angle of view and brightness.

The present invention intends to solve the above-noted problems by a Gauss type rear focus lens basically comprising two groups, i.e., a forward group $G_F$ having, in succession from the object side, a first lens component L1 having its convex surface facing the object side and having a positive refractive power, a second lens component L2 comprised of at least one lens and having a positive refractive power, and a third lens component L3 having its sharply concave surface facing the image side and having a negative refractive power, said forward group having a positive refractive power as a whole, and a rearward group $G_R$ having a fourth lens component L4 having its sharply concave surface facing the object side and having a negative refractive power, a fifth lens component L5 having its sharply convex surface facing the image side and having a positive refractive power, and a sixth lens component L6 having a positive refractive power, said rearward group having a positive refractive power as a whole, wherein the rearward group $G_R$ is moved along the optic axis when the focusing from infinity to a short distance is effected, and the following conditions are satisfied:

$$0.3 < l/f < 0.4 \tag{1}$$

$$0.7 < f_R/f < 0.9 \tag{2}$$

$$0.4 = Hex/Hin < 0.6 \tag{3}$$

where f is the focal length of the entire system, $f_R$ is the focal length of the rearward group $G_R$, l is the air space between the forward group $G_F$ and the rearward group $G_R$ during infinity, Hin is the height at which a land light ray of the greatest incidence height passes through the first surface of the forward group $G_F$, and Hex is the height at which the land light ray of the greatest incidence height passes through the first surface of the forward group $G_F$ and leaves the last surface of the rearward group $G_R$.

To realize a better effect, it is desirable that the fourth lens component L4 and the fifth lens component L5 be disposed so as to constitute an air lens between the fourth lens component L4 and the fifth lens component L5 and the following conditions be satisfied:

$$-1 < \frac{f}{f_{AIR}} < 0 \tag{4}$$

$$10 < \nu_{d5} - \nu_{d4} \tag{5}$$

where $f_{AIR}$ is the focal length of said air lens, and $\nu_{d4}$ and $\nu_{d5}$ are the Abbe numbers, respectively, of the fourth lens component L4 and the fifth lens component L5 having a positive refractive power.

The above-mentioned conditions will hereinafter be explained. Condition (1) is a condition for securing the spacing between the forward group $G_F$ and the rearward group $G_R$ necessary to obtain a good image even when only the rearward group $G_R$ is moved toward the object side and focused to a close distance. If the upper limit of condition (1) is exceeded, the full length of the lens will become long and therefore, compactness of the lens will be spoiled and further, it will become difficult to secure the quantity of light around the picture plane. If the lower limit of condition (1) is exceeded, it will become difficult to secure the movement distance for focusing and the forward group $G_F$ and the rearward group $G_R$ will become liable to mechanically interfere with each other when focusing to a short distance is effected, and it will become impossible to focus the lens to a close distance, and this is not preferable.

Condition (2) is a condition for prescribing the refractive power of the rearward group $G_R$ necessary to accomplish focusing while securing a good depicting performance from infinity to a close distance under condition (1). The closer to the upper limit of condition (2) the ratio of $f_R$ and f is, the smaller the refractive power of the rearward group $G_R$ becomes, and this is advantageous for correction of aberrations. However, if the upper limit of condition (2) is exceeded, the amount of movement of the rearward group $G_R$ will become great during the focusing to a short distance and therefore, the forward group $G_F$ and the rearward group $G_R$ will become liable to mechanically interfere with each other, and this is not preferable. If the lower limit of condition (2) is exceeded, the refractive power of the rearward group $G_R$ which is the focusing group will become great and the fluctuations of spherical aberration and coma will become liable to be remarkably great and the depicting performance will be aggravated and thus, correction of aberrations will become difficult.

Condition (3) is a condition for achieving a light weight of the rearward group $G_R$ moved during focusing. The closer to the lower limit of this condition, the smaller can be made the outside diameter of the lens of the rearward group $G_R$ and therefore, it become possible to achieve a light weight. However, if the lower limit of this condition is exceeded, the refractive power of each group will become too strong and correction of aberrations will become difficult. Also, particularly when a long back focal length is necessary as in a bright lens for a single-lens reflex camera, the back focal length will become deficient. If the upper limit of this condition is exceeded, the outside diameter of the lens of the rearward group $G_R$ will become great, and this may result in bulkiness of the lens system. Also, a great power will become necessary to move the rearward group $G_R$ toward the object side during focusing and therefore, quick focusing will become difficult, and this is not preferable in practice.

Further, to realize a better effect, it is desirable that the present invention be constructed so as to satisfy condition (4) and condition (5). Conditions (4) and (5) will hereinafter be explained.

Condition (4) prescribes the refractive power of the air lens formed between the fourth lens component L4 of the rearward group $G_R$ which has a negative refractive power and the fifth lens component L5 of the rearward group $G_R$ which has a positive refractive power. The air lens in this case has a negative refractive power and therefore, it becomes possible to make up for the negative refractive power of the fourth lens component L4 and the degree of freedom in correction of aberrations can be increased. Also, it becomes possible to achieve a light weight of the rearward group $G_R$ which is the moved group during focusing and at the same time, secure the movement space during focusing, and this is very effective when focusing is effected. If the upper limit of this condition is exceeded, the burden of the negative refractive power of the fourth lens component L4 will be increased and therefore, the curvature of that surface of the fourth lens component L4 which is adjacent to the object side will become sharp, and spherical aberration will be over-corrected and sagittal coma flare will increase. Also, the edge thickness of the fourth lens component L4 having a negative refractive power will increase and therefore, the space in which the rearward group $G_R$ is movable during focusing will become short as compared with the air space between the forward group $G_F$ and the rearward group $G_R$, and the close distance to which the lens can be focused will become long. If the lower limit of this condition is exceeded, the achromatic effect of the fourth lens component L4 having a negative refractive power and the fifth lens component L5 having a positive refractive power will be weakened and therefore, correction of chromatic aberration will become difficult, and this is not preferable.

Condition (5) prescribes the difference between the Abbe numbers of the fourth lens component L4 having a negative refractive power and the fifth lens component L5 having a positive refractive power. In the lens of the present invention in which focusing is accomplished by the axial movement of the rearward group, it is desirable that achromatism be achieved in each group to suppress the fluctuation of chromatic aberration during short distance focusing. However, the space between the fourth lens component L4 having a negative refractive power and the fifth lens component L5 having a positive refractive power is an air lens and therefore, unless the difference in Abbe number is provided as in condition (5), the chromatic aberration in the rearward group $G_R$ will be undercorrected. Accordingly, it is desirable that this condition be satisfied.

DESCRIPTION OF THE PREFERRED EMBODIMENTS

Figure 1:
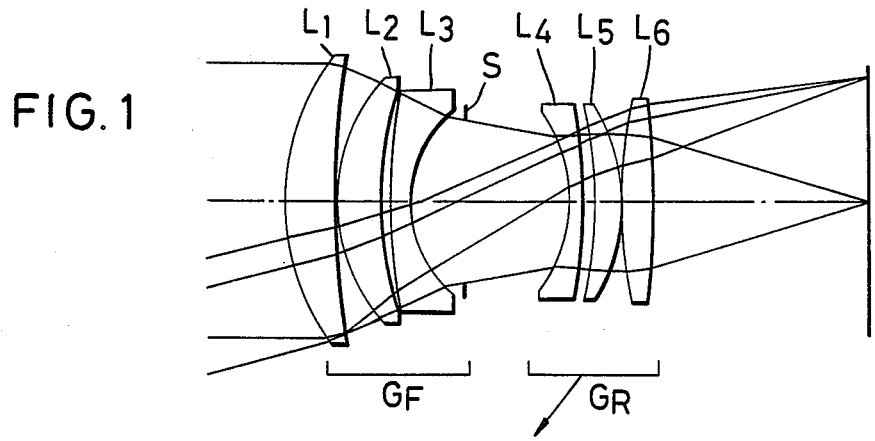
FIG. 1 shows the construction and optical path of a first embodiment of the present invention.

Embodiment 1 of the present invention, as shown in FIG. 1, is comprised of two groups, i.e., a forward group $G_F$ and a rearward group $G_R$ each having a positive refractive power, and each lens component comprises a lens. The forward group $G_F$ comprises, in succession from the object side, positive meniscus lenses L1 and L2 having their convex surfaces facing the object side, and a negative meniscus lens L3 having its sharply concave surface facing the image side, the rearward group $G_R$ comprises, in succession from the object side, a negative meniscus lens L4 having its sharply concave surface facing the object side, a positive meniscus lens L5 having its convex surface facing the image side, and a biconvex positive lens L6, and a stop S is disposed between the forward group and the rearward group. Focusing of this lens system adopts the so-called rearward group axial movement system in which the rearward group $G_R$ is moved toward the object side to thereby accomplish focusing to a short distance object.

The numerical data of Embodiment 1 will be shown in Table 1 below. In the table, the numbers at the left end represent the order from the object side, and the refractive index n and the Abbe number $\nu$ are for d-line ($\lambda = 587.6$ nm).

TABLE 1

(Embodiment 1)

| No. | Radius of curvature r | Center thickness and air space d | Refractive index n | Abbe number ν | |
|---|---|---|---|---|---|
| 1 | 42.082 | 8.800 | 1.76684 | 46.76 | $G_F$ |
| 2 | 214.882 | 0.200 | | | |
| 3 | 32.583 | 7.800 | 1.72000 | 50.28 | |
| 4 | 61.173 | 1.600 | | | |
| 5 | 112.400 | 3.200 | 1.78470 | 26.07 | |
| 6 | 21.331 | (variable) | | | |
| 7 | −24.800 | 2.400 | 1.62588 | 35.64 | $G_R$ |
| 8 | −104.881 | 2.000 | | | |
| 9 | −69.065 | 5.000 | 1.69350 | 53.76 | |
| 10 | −30.448 | 0.200 | | | |
| 11 | 87.287 | 5.000 | 1.76684 | 46.76 | |
| 12 | −125.021 | Bf = variable | | | |

Focal length 85 mm, F-No. 1.8, Angle of view 28°
Bf: 38.2080–50.8697
$d_6$: 27.6330–14.9713
$l/f = 0.33$
$f_R/f = 0.84$
Hex/Hin = 0.47
$f/f_{AIR} = -0.33$
$\nu_{d5} - \nu_{d4} = 18.1$ In the lens according to the above-described Embodiment 1, focusing can be accomplished up to a close distance of the order of 0.85 m.

Figure 2:
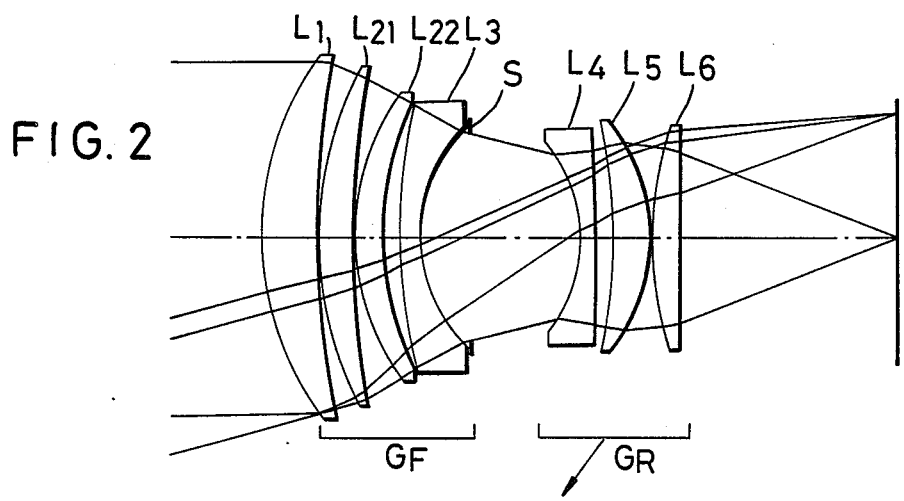
FIG. 2 shows the construction and optical path of a second embodiment of the present invention.

Embodiment 2 of the present invention, as shown in FIG. 2, is comprised of two groups, i.e., a forward group $G_F$ and a rearward group $G_R$ each having a positive refractive power. The forward group $G_F$ comprises, in succession from the object side, a first lens component which is a positive meniscus lens L1 having its convex surface facing the object side, a second lens component comprising two positive meniscus lenses L21 and L22 having their convex surfaces facing the object side, and a third lens component which is a negative meniscus lens L3 having its sharply concave surface facing the image side, and the rearward group $G_R$ comprises, in succession from the object side, a fourth lens component which is a negative meniscus lens L4 having its sharply concave surface facing the object side, a fifth lens component which is a positive meniscus lens L5 having its convex surface facing the image side, and a sixth lens component which is a positive lens L6 having its surface of sharper curvature facing the object side, and a stop S is disposed between the forward group and the rearward group. Focusing of this lens system adopts the so-called rearward group axial movement system in which the rearward group $G_R$ is moved toward the object side to thereby accomplish focusing to a short distance object.

The numerical data of Embodiment 2 will be shown below.

TABLE 2

(Embodiment 2)

| No. | Radius of curvature r | Center thickness and air space d | Refractive index n | Abbe number ν | |
|---|---|---|---|---|---|
| 1 | 52.885 | 9.600 | 1.76684 | 46.76 | $G_F$ |
| 2 | 153.096 | 0.200 | | | |
| 3 | 65.226 | 5.200 | 1.69350 | 53.76 | |
| 4 | 117.538 | 0.200 | | | |
| 5 | 36.619 | 6.000 | 1.69350 | 53.76 | |
| 6 | 57.764 | 2.600 | | | |
| 7 | 94.999 | 3.000 | 1.78470 | 26.07 | $G_R$ |
| 8 | 24.998 | (variable) | | | |
| 9 | −26.781 | 3.000 | 1.75520 | 27.64 | |
| 10 | −330.374 | 2.768 | | | |
| 11 | −89.408 | 6.600 | 1.84042 | 43.30 | |
| 12 | −31.263 | 0.200 | | | |
| 13 | 62.983 | 5.000 | 1.84042 | 43.30 | |
| 14 | −841.365 | Bf = variable | | | |

Focal length 85 mm, F-No. 1.4, Angle of view 28°
Bf: 38.6553–51.2848
$d_8$: 28.4636–15.8372
$l/f = 0.33$
$f_R/f = 0.77$
Hex/Hin = 0.48
$f/f_{AIR} = -0.60$
$\nu_{d5} - \nu_{d4} = 15.7$ In the lens according to the above-described Embodiment 2, focusing can be accomplished up to a close distance of the order of 0.85 m.

Figure 3:
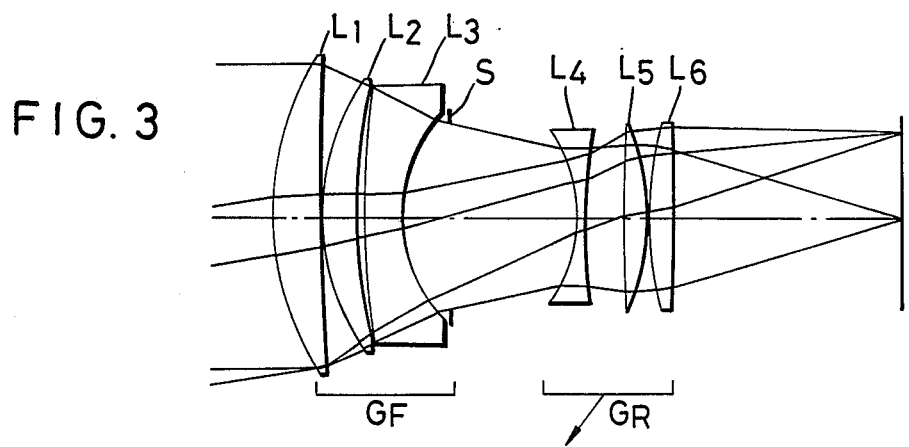
FIG. 3 shows the construction and optical path of a third embodiment of the present invention.

Embodiment 3 of the present invention, as shown in FIG. 3, is comprised of two groups, i.e., a forward group $G_F$ and a rearward group $G_R$ each having a positive refractive power, and each lens component comprises a lens. The forward group $G_F$ comprises, in succession from the object side, positive meniscus lenses L1 and L2 having their convex surfaces facing the object side, and a negative meniscus lens L3 having its sharply concave surface facing the image side, and the rearward group $G_R$ comprises, in succession from the object side, a negative lens L4 having its sharply concave surface facing the object side, a positive lens L5 having its sharply convex surface facing the image side, and a positive lens L6 having its sharply convex surface facing the object side, and a stop S is disposed between the forward group $G_F$ and the rearward group $G_R$. Focusing of this lens system adopts the so-called rearward group axial movement system in which the rearward group $G_R$ is moved toward the object side to thereby accomplish focusing.

The numerical data of Embodiment 3 will be shown below.

TABLE 3

(Embodiment 3)

| No. | Radius of curvature r | Center thickness and air space d | Refractive index n | Abbe number ν | |
|---|---|---|---|---|---|
| 1 | 65.175 | 12.500 | 1.72000 | 50.28 | $G_F$ |
| 2 | 672.339 | 0.200 | | | |
| 3 | 52.487 | 8.500 | 1.69350 | 53.76 | |
| 4 | 124.028 | 2.600 | | | |
| 5 | 292.492 | 9.451 | 1.71736 | 29.48 | |
| 6 | 32.828 | (variable) | | | |
| 7 | −43.586 | 2.500 | 1.61293 | 36.99 | $G_R$ |
| 8 | 188.553 | 9.791 | | | |
| 9 | 525.022 | 6.200 | 1.69350 | 53.76 | |
| 10 | −55.564 | 0.200 | | | |
| 11 | 112.917 | 5.000 | 1.69350 | 53.76 | |
| 12 | −614.486 | Bf = variable | | | |

Focal length 135 mm, F-No. 1.8, Angle of view 18°
Bf: 32.5126–57.2621
$d_6$: 43.0000–18.4431
$l/f = 0.32$
$f_R/f = 0.84$
Hex/Hin = 0.45
$f/f_{AIR} = -0.25$ $\nu_{d5} - \nu_4 = 16.8$ In the lens according to the above-described Embodiment 3, focusing can be accomplished up to a close distance of the order of 1.2 m.

As described above, making the focusing group lighter in weight can be achieved by the present invention and therefore, quick focusing and compactness of the driving device for focusing become possible and thus, the lens of the present invention is effective as a lens for auto focus.

I claim:

1. A Gauss type rear focus lens including:
a forward group having, in succession from the object side, a first lens component having its convex surface facing the object side and having a positive refractive power, a second lens component comprised of at least one lens and having a positive refractive power, and a third lens component having its sharply concave surface facing the image side and having a negative refractive power, said forward group having a positive refractive power as a whole; and
a rearward group disposed on the image side relative to said forward group, said rearward group having a fourth lens having its sharply concave surface facing the object side and having a negative refractive power, a fifth lens having its sharply convex surface facing the image side and having a positive refractive power, and a sixth lens having a positive refractive power, said rearward group having a positive refractive power;
wherein during the focusing from infinity to a short distance, said rearward group is moved along the optic axis, and the following conditions are satisfied:

$0.3 < l/f < 0.4$ $0.7 < f_R/f < 0.9$ $0.4 < Hex/Hin < 0.6$ where f is the focal length of the entire system, $f_R$ is the focal length of said rearward group, l is the air space between said forward group and said rearward groups during infinity, Hin is the height at which a land light ray of the greatest incidence height passes through the first surface of said forward group, and Hex is the height at which the land light ray of the greatest incidence height passes through the first surface of said forward group and leaves the last surface of said rearward group.

2. A Gauss type rear focus lens according to claim 1, wherein an air space is disposed so as to constitute an air lens between said fourth lens component and said fifth lens component, and the following condition is satisfied:

$$-1 < \frac{f}{f_{AIR}} < 0,$$

where $f_{AIR}$ is the focal length of said air lens.

3. A Gauss type rear focus lens according to claim 2, wherein the following condition is satisfied:

$10 < \nu_{d5} - \nu_4$, where $\nu_{d4}$ and $\nu_{d5}$ are the Abbe numbers, respectively, of said fourth lens component having a negative refractive power and said fifth lens component having a positive refractive power.

4. A Gauss type rear focus lens according to claim 1, wherein the numerical data are as follows:

| No. | Radius of curvature r | Center thickness and air space d | Refractive index n | Abbe number $\nu$ | |
|---|---|---|---|---|---|
| 1 | 42.082 | 8.800 | 1.76684 | 46.76 | $G_F$ |
| 2 | 214.882 | 0.200 | | | |
| 3 | 32.583 | 7.800 | 1.72000 | 50.28 | |
| 4 | 61.173 | 1.600 | | | |
| 5 | 112.400 | 3.200 | 1.78470 | 26.07 | |
| 6 | 21.331 | (variable) | | | |
| 7 | −24.800 | 2.400 | 1.62588 | 35.64 | $G_R$ |
| 8 | −104.881 | 2.000 | | | |
| 9 | −69.065 | 5.000 | 1.69350 | 53.76 | |
| 10 | −30.448 | 0.200 | | | |
| 11 | 87.287 | 5.000 | 1.76684 | 46.76 | |
| 12 | −125.021 | Bf = variable | | | |

Focal length 85 mm, F-No. 1.8, Angle of view 28°
Bf: 38.2080–50.8697
$d_6$: 27.6330–14.9713
$l/f = 0.33$
$f_R/f = 0.84$
Hex/Hin = 0.47
$f/f_{AIR} = -0.33$
$\nu_{d5} - \nu_{dr} = 18.1$ where the numbers at the left end represent the order from the object side, and the refractive index n and the Abbe number $\nu$ are for d-line ($\lambda$ = 587.6 nm).

5. A Gauss type rear focus lens according to claim 1, wherein the numerical data are as follows:

| No. | Radius of curvature r | Center thickness and air space d | Refractive index n | Abbe number $\nu$ | |
|---|---|---|---|---|---|
| 1 | 52.885 | 9.600 | 1.76684 | 46.76 | $G_F$ |
| 2 | 153.096 | 0.200 | | | |
| 3 | 65.226 | 5.200 | 1.69350 | 53.76 | |
| 4 | 117.538 | 0.200 | | | |
| 5 | 36.619 | 6.000 | 1.69350 | 53.76 | |
| 6 | 57.764 | 2.600 | | | |
| 7 | 94.999 | 3.000 | 1.78470 | 26.07 | |
| 8 | 24.998 | (variable) | | | |
| 9 | −26.781 | 3.000 | 1.75520 | 27.64 | $G_R$ |
| 10 | −330.374 | 2.768 | | | |
| 11 | −89.408 | 6.600 | 1.84042 | 43.30 | |
| 12 | −31.263 | 0.200 | | | |
| 13 | 62.983 | 5.000 | 1.84042 | 43.30 | |
| 14 | −841.365 | Bf = variable | | | |

Focal length 85 mm, F-No. 1.4, Angle of view 28°
Bf: 38.6553–51.2848
$d_8$: 28.4636–15.8372
$l/f = 0.33$
$f_R/f = 0.77$
Hex/Hin = 0.48
$f/f_{AIR} = -0.60$
$\nu_{d5} - \nu_{d4} = 15.7$ where the numbers at the left end represent the order from the object side, and the refractive index n and the Abbe number $\nu$ are for d-line ($\lambda$ = 587.6 nm).

6. A Gauss type rear focus lens according to claim 1, wherein the numerical data are as follows:

| No. | Radius of curvature r | Center thickness and air space d | Refractive index n | Abbe number $\nu$ | |
|---|---|---|---|---|---|
| 1 | 65.175 | 12.500 | 1.72000 | 50.28 | $G_F$ |
| 2 | 672.339 | 0.200 | | | |
| 3 | 52.487 | 8.500 | 1.69350 | 53.76 | |
| 4 | 124.028 | 2.600 | | | |
| 5 | 292.492 | 9.451 | 1.71736 | 29.48 | |
| 6 | 32.828 | (variable) | | | |
| 7 | −43.586 | 2.500 | 1.61293 | 36.99 | $G_R$ |
| 8 | 188.553 | 9.791 | | | |
| 9 | 525.022 | 6.200 | 1.69350 | 53.76 | |
| 10 | −55.564 | 0.200 | | | |
| 11 | 112.917 | 5.000 | 1.69350 | 53.76 | |
| 12 | −614.486 | Bf = variable | | | |

Focal length 135 mm, F-No. 1.8, Angle of view 18°
Bf: 32.5126–57.2621
$d_6$: 43.0000–18.4431
$1/f = 0.32$
$f_R/f = 0.84$
Hex/Hin = 0.45
$f/f_{AIR} = -0.25$
$\nu_{d5} - \nu_{d4} = 16.8$ where the numbers at the left end represent the order from the object side, and the refractive index n and the Abbe number $\nu$ are for d-line ($\lambda = 587.6$ nm).

7. A Gauss type rear focus lens including:
a forward group having, in succession from the object side, a first lens component having its convex surface facing the object side and having a positive refractive power, a second lens component comprised of at least one lens and having a positive refractive power, and a third lens component having its sharply concave surface facing the image side and having a negative refractive power, said forward group having a positive refractive power as a whole; and
a rearward group disposed on the image side relative to said forward group, said rearward group having a fourth lens having its sharply concave surface facing the object side and having a negative refractive power, a fifth lens having its sharply convex surface facing the image side and having a positive refractive power, and a sixth lens having a positive refractive power, said rearward group having a positive refractive power;
wherein during the focusing from infinity to a short distance, said rearward group is moved along the optic axis, and the following conditions are satisfied:

$$0.7 < f_R/f < 0.9$$

$$0.4 < \text{Hex/Hin} < 0.6$$

$$- < f/f_{AIR} < 0$$

where f is the focal length of the entire system, $f_R$ is the focal length of said rearward group, Hin is the height at which a land light ray of the greatest incidence height passes through the first surface of said forward group, Hex is the height at which the land light ray of the greatest incidence height passes through the first surface of said forward group and leaves the last surface of said rearward group, and $f_{AIR}$ is the focal length of an air lens disposed between said fourth lens component and said fifth lens component.

8. A Gauss type rear focus lens according to claim 7, wherein the following condition is satisfied:

$$10 < \nu_{d5} - \nu_{d4},$$

where $\nu_{d4}$ and $\nu_{d5}$ are the Abbe numbers, respectively, of said fourth lens component having a negative refractive power and said fifth lens component having a positive refractive power.

* * * * *